(12) United States Patent
Mori

(10) Patent No.: US 11,411,481 B2
(45) Date of Patent: Aug. 9, 2022

(54) ACTUATOR

(71) Applicant: NIDEC SANKYO CORPORATION, Nagano (JP)

(72) Inventor: Akira Mori, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 214 days.

(21) Appl. No.: 16/720,169

(22) Filed: Dec. 19, 2019

(65) Prior Publication Data

US 2020/0204054 A1 Jun. 25, 2020

(30) Foreign Application Priority Data

Dec. 20, 2018 (JP) .............................. JP2018-237878

(51) Int. Cl.

| H02K 33/16 | (2006.01) |
|---|---|
| H02K 11/33 | (2016.01) |
| H02K 33/02 | (2006.01) |
| H02K 11/00 | (2016.01) |
| H02K 5/24 | (2006.01) |

(52) U.S. Cl.
CPC ............... *H02K 33/16* (2013.01); *H02K 5/24* (2013.01); *H02K 11/0094* (2013.01); *H02K 11/33* (2016.01); *H02K 33/02* (2013.01)

(58) Field of Classification Search
CPC ............................... H02K 33/02; H02K 33/16
See application file for complete search history.

(56) References Cited

U.S. PATENT DOCUMENTS

| 4,392,701 A * | 7/1983 | Weidler ................. H01R 31/02 439/405 |
| 2011/0312213 A1* | 12/2011 | Arai ....................... H01R 12/62 439/492 |
| 2019/0190365 A1* | 6/2019 | Takeda ..................... B06B 1/04 |

FOREIGN PATENT DOCUMENTS

| JP | 2016127789 A | 7/2016 |
| WO | WO-2018030265 A1 * | 2/2018 ............... B06B 1/04 |

* cited by examiner

*Primary Examiner* — Tulsidas C Patel
*Assistant Examiner* — Robert E Mates
(74) *Attorney, Agent, or Firm* — Cantor Colburn LLP

(57) ABSTRACT

An actuator may include a movable body, a support body, a connection body having at least one of elasticity and viscoelasticity, and a magnetic drive circuit having a coil provided in one side member of the movable body and the support body, and a permanent magnet provided in the other side member to vibrate the movable body. The one side member may include a coil holder and a power feeding circuit board fixed to the coil holder in a state that one side face of the circuit board faces an outer side, and the one side face may have a land connected with a coil wire structuring the coil. The circuit board may be fixed to the coil holder in a state that the one side face is retracted from an end face of the coil holder, and the coil wire may have a slack portion fixed to the one side face.

4 Claims, 11 Drawing Sheets

ACTUATOR

CROSS REFERENCE TO RELATED APPLICATION

The present application claims priority under 35 U.S.C. § 119 to Japanese Application No. 2018-237878 filed on Dec. 20, 2018, the entire content of which is incorporated herein by reference.

TECHNICAL FIELD

The present invention relates to an actuator structured to linearly drive and vibrate a movable body.

BACKGROUND

As a device structured to notify information by vibration, an actuator has been proposed which includes a movable body having a permanent magnet and a support body having a coil facing the permanent magnet. The support body includes a coil holder which holds the coil, a case which covers the movable body and the coil holder, and a power feeding circuit board with which a coil wire structuring the coil is connected (see Japanese Patent Laid-Open No. 2016-127789 (Patent Literature 1)). In the actuator described in Patent Literature 1, the power feeding circuit board is fixed to the case.

In the actuator described in Patent Literature 1, the power feeding circuit board is fixed to the case so as to protrude from the case and thereby, an outside dimension of the actuator is increased.

SUMMARY

In view of the problem described above, at least an embodiment of the present invention may provide an actuator capable of reducing an outside dimension even when a power feeding circuit board is fixed to a coil holder.

To solve the above mentioned problem, at least an embodiment of the present invention may provide an actuator including a movable body, a support body, a connection body which is provided with at least one of elasticity and viscoelasticity and is disposed so as to contact with both of the movable body and the support body at a position where the movable body and the support body are faced each other, and a magnetic drive circuit. The magnetic drive circuit may include a coil provided in one side member which is one of the movable body and the support body, and a permanent magnet provided in the other side member which is the other of the movable body and the support body so as to face the coil in a first direction, and the magnetic drive circuit may be structured to vibrate the movable body with respect to the support body in a second direction intersecting the first direction. The one side member may include a coil holder which holds the coil, and a power feeding circuit board which is fixed to the coil holder in a state that one side face of the power feeding circuit board faces an outer side, the one side face being provided with a land connected with a coil wire structuring the coil with a solder. The power feeding circuit board may be fixed to the coil holder in a state that the one side face is retracted from an end face of the coil holder, and the coil wire may be provided with a slack portion provided between the coil and a connected position with the power feeding circuit board, and the slack portion may be fixed to the one side face with an adhesive.

In at least an embodiment of the present invention, the power feeding circuit board may be fixed to the coil holder in a state that one side face where a land is provided faces an outer side, and the one side face of the power feeding circuit board is set in a retracted state from an end face of the coil holder. Therefore, even when the power feeding circuit board is fixed to the coil holder, the outside dimension is not increased. Further, the one side face of the power feeding circuit board may be retracted from an end face of the coil holder and thus, even when a coil wire is connected with the land by a solder, the solder does not greatly protrude from the end face of the coil holder. Further, a slack portion may be provided in the coil wire and thus, the coil wire is hardly disconnected in an assembly process of the actuator. Further, the slack portion may be fixed to the one side face of the power feeding circuit board with an adhesive and thus, after the actuator has been assembled, the slack portion does not hardly protrude from the end face. Further, the one side face of the power feeding circuit board may be retracted from the end face of the coil holder and thus, the adhesive does not greatly protrude from the end face of the coil holder.

In at least an embodiment of the present invention, it may be structured that the coil holder is provided with a step part which is retracted from the end face of the coil holder, and a guide groove which is opened in the step part for guiding the coil wire from the coil to the power feeding circuit board, and the slack portion is fixed to the step part and the one side face with the adhesive.

In at least an embodiment of the present invention, it may be structured that the step part and the one side face are located on the same imaginary plane.

In at least an embodiment of the present invention, it may be structured that the solder and the adhesive are located at positions retracted from the end face of the coil holder.

In at least an embodiment of the present invention, it may be structured that the one side member is the support body, and the other side member is the movable body. In other words, it may be structured that the coil is provided in the support body and the magnet is provided in the movable body.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings. In the following descriptions, "X" is indicated in a linearly moving direction (second direction, vibration direction) of a movable body 6, "Z" is indicated in a first direction intersecting the second direction "X", and "Y" is indicated in a third direction intersecting the first direction "Z" and the second direction "X". In addition, "X1" is indicated on one side in the second direction "X", "X2" is indicated on the other side in the second direction "X", "Z1" is indicated on one side in the first direction "Z", "Z2" is indicated on the other side in the first direction "Z", "Y1" is indicated on one side in the third direction "Y", and "Y2" is indicated on the other side in the third direction "Y". Further, in the following descriptions, a structure will be described below mainly that one side member holding a coil is a support body 2 and the other side member holding a permanent magnet is a movable body 6.

[Entire Structure]

Figure 1:
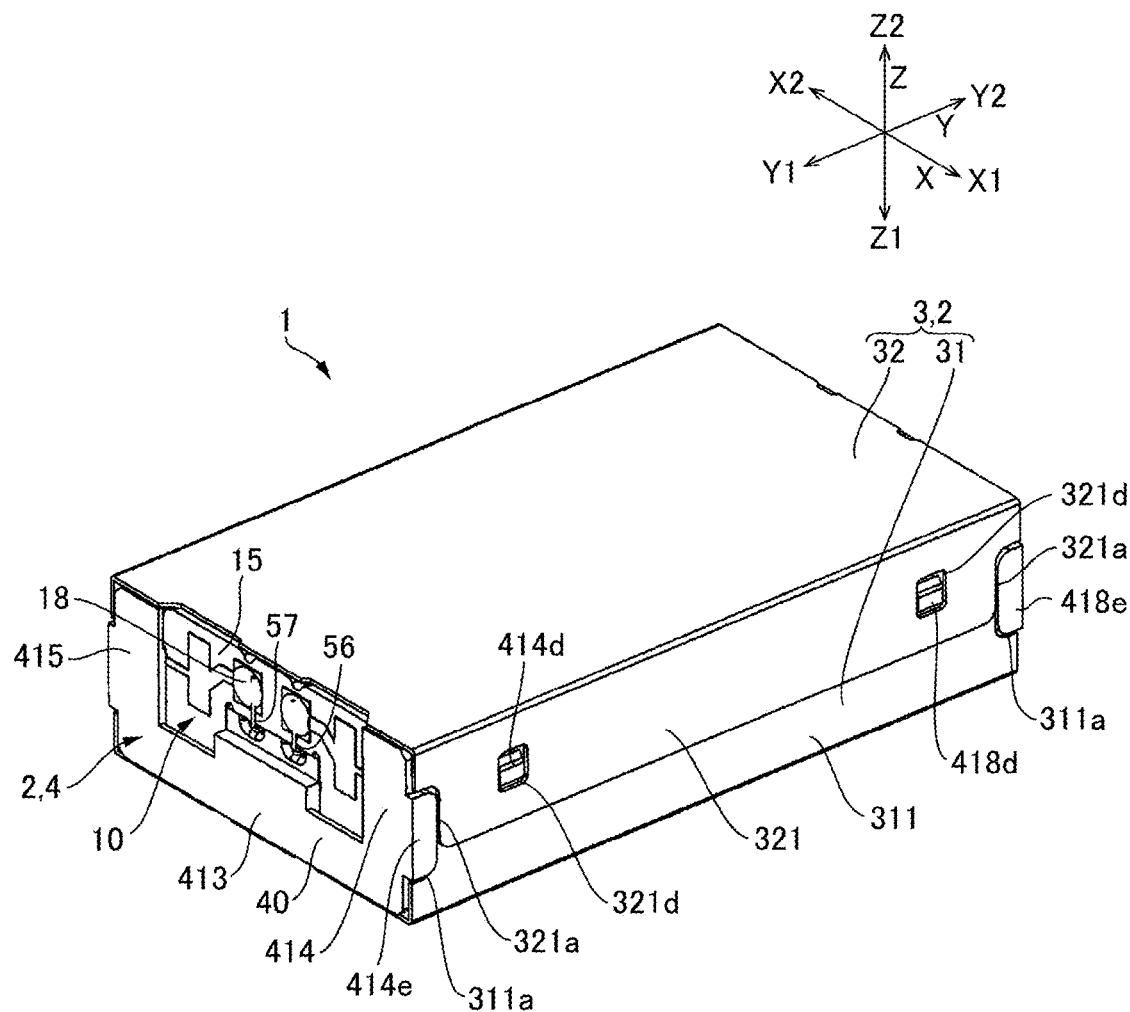
FIG. 1 is a perspective view showing an actuator in accordance with an embodiment of the present invention.
Figure 2:
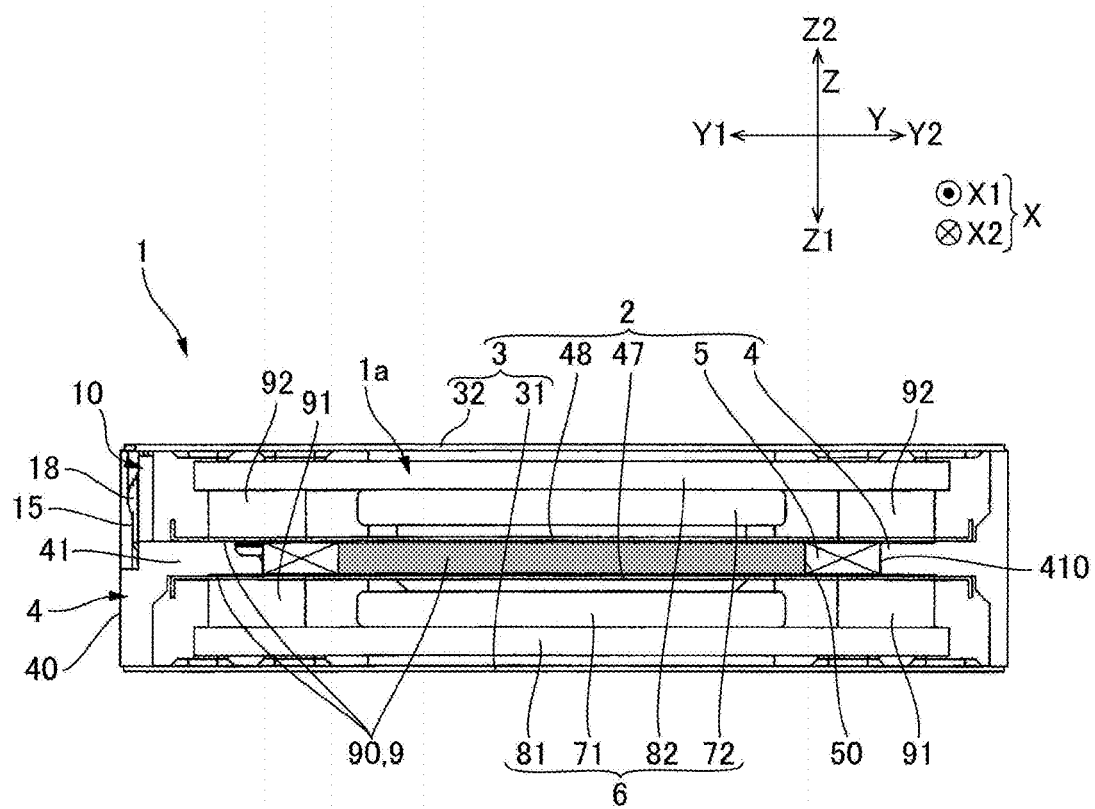
FIG. 2 is a "Y-Z" cross-sectional view showing the actuator in FIG. 1.
Figure 3:
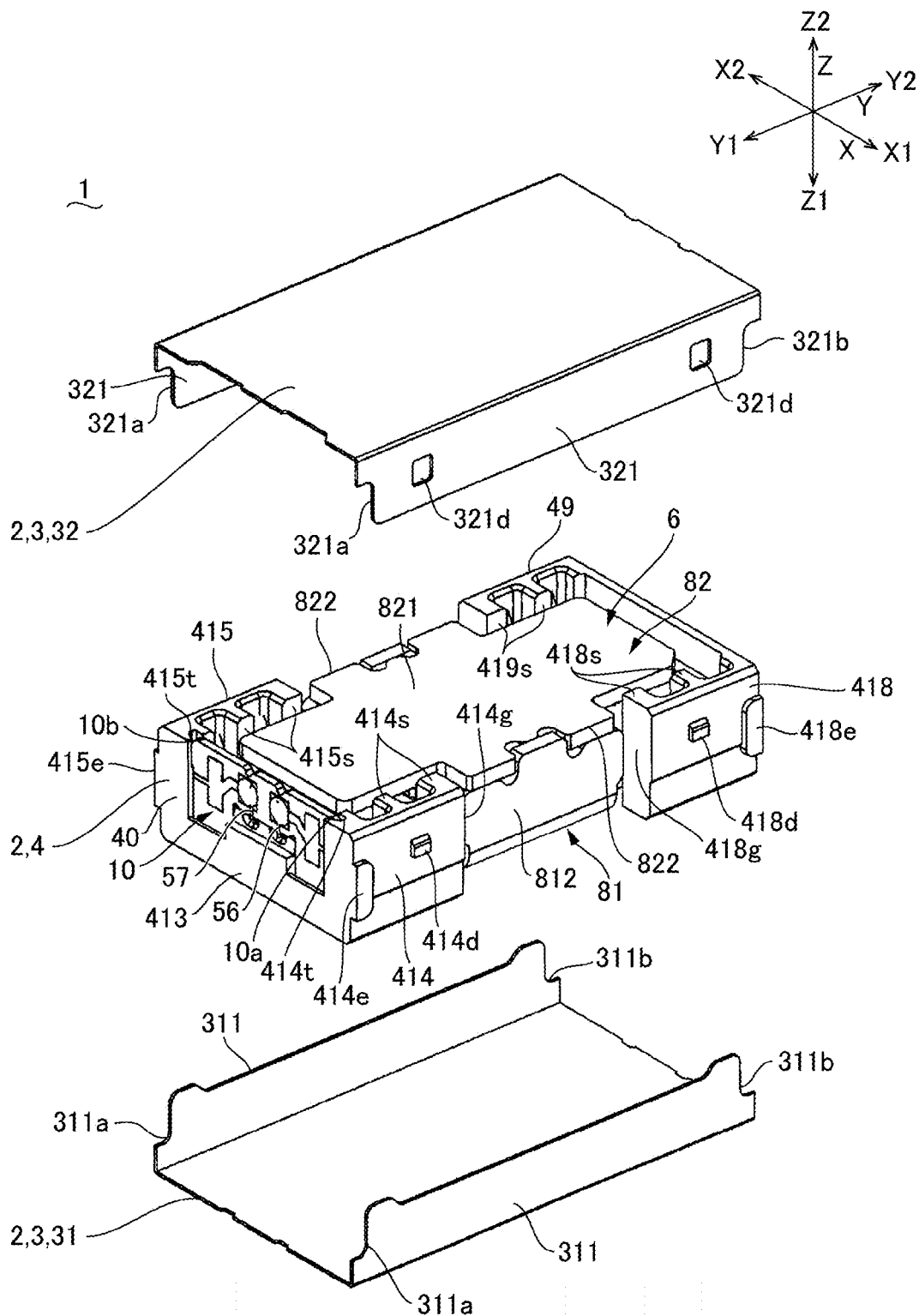
FIG. 3 is an exploded perspective view showing the actuator in FIG. 1.
Figure 4:
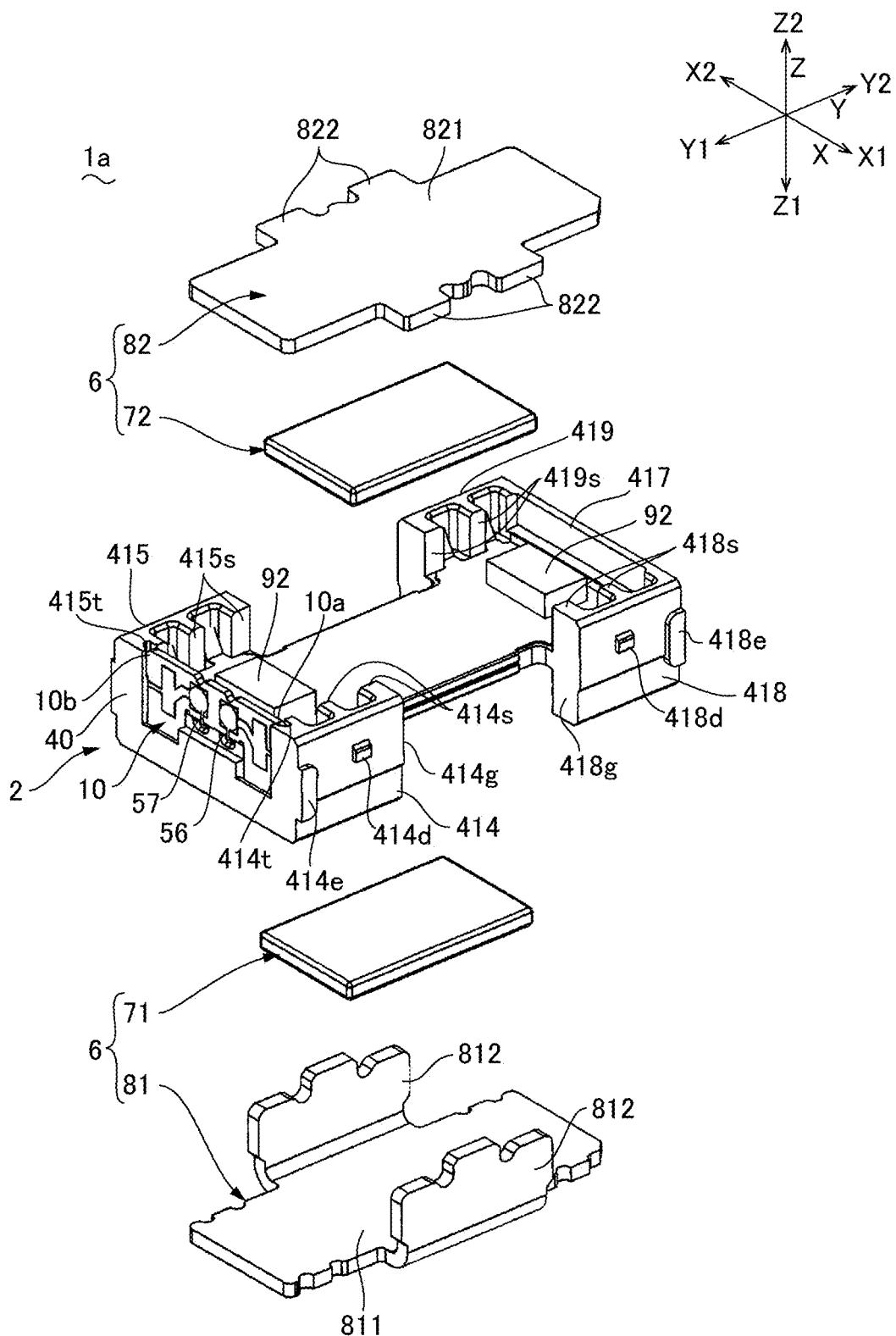
FIG. 4 is an exploded perspective view showing the actuator shown in FIG. 1 which is disassembled into a support body and a movable body.
Figure 5:
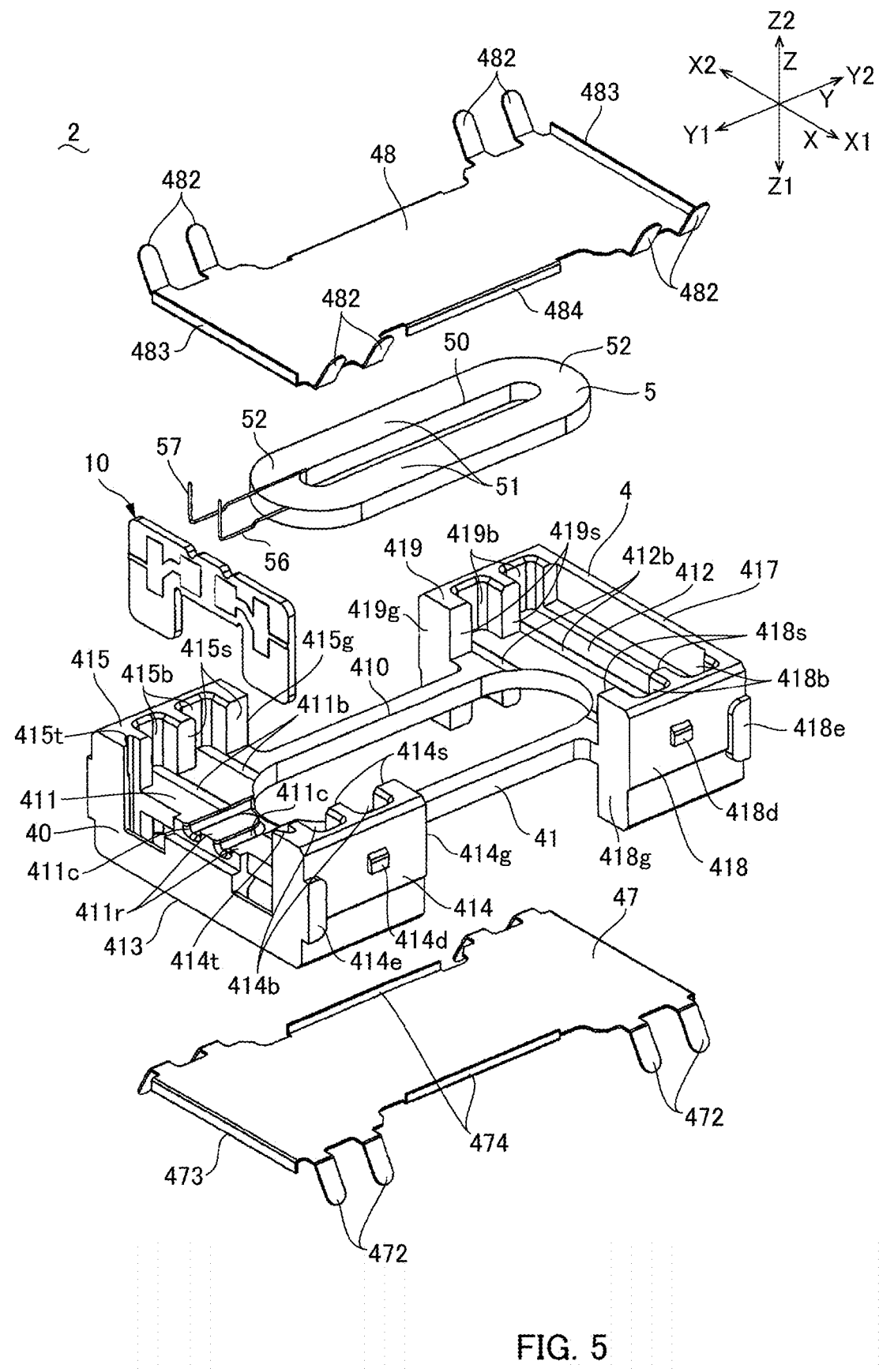
FIG. 5 is an exploded perspective view showing the support body in FIG. 4 which is viewed from the other side in a first direction.
Figure 6:
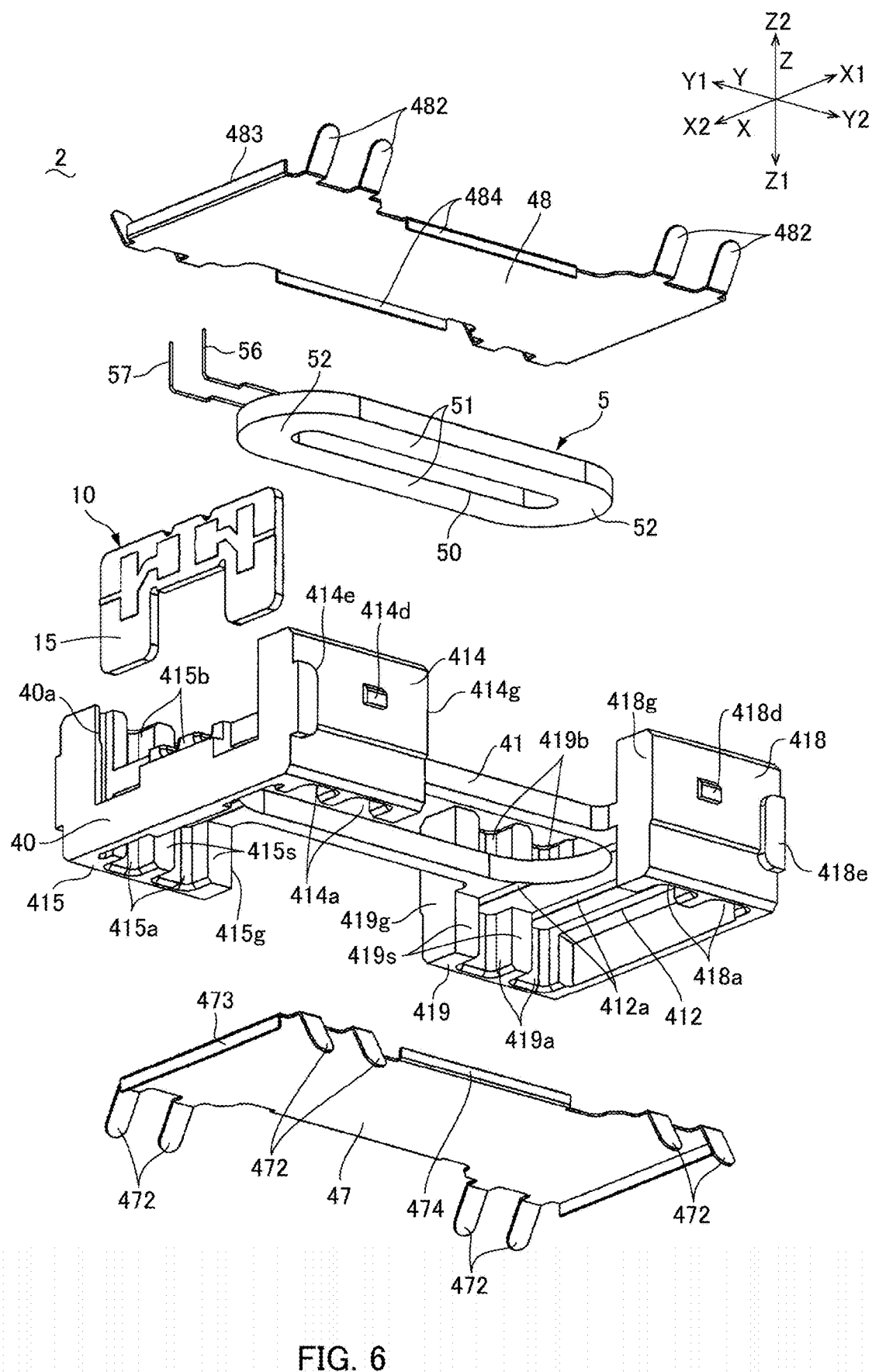
FIG. 6 is an exploded perspective view showing the support body in FIG. 4 which is viewed from one side in the first direction.

FIG. 1 is a perspective view showing an actuator 1 in accordance with an embodiment of the present invention. FIG. 2 is a "Y-Z" cross-sectional view showing the actuator 1 in FIG. 1. FIG. 3 is an exploded perspective view showing the actuator 1 in FIG. 1. FIG. 4 is an exploded perspective view showing the actuator shown in FIG. 1 which is disassembled into a support body 2 and a movable body 6. FIG. 5 is an exploded perspective view showing the support body 2 in FIG. 4 which is viewed from the other side "Z2" in the first direction "Z". FIG. 6 is an exploded perspective view showing the support body 2 in FIG. 4 which is viewed from one side "Z1" in the first direction "Z".

An actuator 1 shown in FIG. 1 has a rectangular parallelepiped shape whose longitudinal direction is directed in the third direction "Y" and can be used as an information transmission device such as a tactile device. In a case that the actuator 1 is used as a tactile device, information is notified to a user who holds the actuator 1 in his/her hand by vibration in the second direction "X". Therefore, the actuator 1 can be utilized as an operation member of a game machine or the like and is capable of realizing a new feeling by vibration or the like. However, application of the actuator 1 is not limited to an information transmission device such as a tactile device.

As shown in FIG. 2 through FIG. 4, the actuator 1 includes a support body 2 including a case 3 in a rectangular shape which defines an outer shape of the actuator 1, and a movable body 6 which is supported in an inside of the case 3 so as to be movable in the second direction "X" with respect to the support body 2. Information is outputted by vibration in the second direction "X" of the movable body 6.

In this embodiment, as described below with reference to FIG. 2 through FIG. 6, the support body 2 includes the case 3, a coil holder 4, a coil 5 and a power feeding circuit board 10, and the movable body 6 includes a permanent magnet (first permanent magnet 71 and second permanent magnet 72) and a yoke (first yoke 81 and second yoke 82). Further, the coil 5 and the permanent magnet (first permanent magnet 71 and second permanent magnet 72) structure a magnetic drive circuit 1a. The movable body 6 is supported by the support body 2 through connection bodies 91 and 92 provided between the movable body 6 and the support body 2. The connection bodies 91 and 92 are provided with at least one of elasticity and viscoelasticity.

[Structure of Movable Body 6]

As shown in FIG. 2 through FIG. 4, the movable body 6 includes a first yoke 81 disposed on one side "Z1" in the first direction "Z" with respect to the coil 5, and a first permanent magnet 71 in a flat plate shape which is held by a face of the first yoke 81 on the other side "Z2" in the first direction "Z" so as to face the coil 5 on one side "Z1" in the first direction "Z". Further, the movable body 6 includes a second yoke 82 disposed on the other side "Z2" in the first direction "Z" with respect to the coil 5, and a second permanent magnet 72 in a flat plate shape which is held by a face of the second yoke 82 on one side "Z1" in the first direction "Z" so as to face the coil 5 on the other side "Z2" in the first direction "Z". In this embodiment, the movable body 6 is structured of the first yoke 81, the first permanent magnet 71, the second yoke 82 and the second permanent magnet 72.

The first yoke 81 is provided with a flat plate part 811 to which the first permanent magnet 71 is fixed and a pair of connecting parts 812 which are bent from end parts of the flat plate part 811 on both sides in the second direction "X" to the other side "Z2" in the first direction "Z". The second yoke 82 is provided with a flat plate part 821 to which the second permanent magnet 72 is fixed and an intermediate portion in the third direction "Y" of the flat plate part 821 is provided with a pair of projecting parts 822 which are projected to one side "X1" and to the other side "X2" in the second direction "X". In this embodiment, a pair of the projecting parts 822 is connected with a pair of the connecting parts 812 of the first yoke 81 by a method such as welding.

Each of the first permanent magnet 71 and the second permanent magnet 72 is magnetized so that a magnetic pole on one side "X1" in the first direction is different from a magnetic pole on the other side "X2" in the first direction.

[Structure of Support Body 2]

As shown in FIG. 1 through FIG. 3, the case 3 of the support body 2 includes a first case member 31 located on one side "Z1" in the first direction "Z" and a second case member 32 which is overlapped with the first case member 31 on the other side "Z2" in the first direction "Z". A pair of side plate parts 311 of the first case member 31 provided on both sides in the second direction "X" is respectively covered with a pair of side plate parts 321 of the second case member 32 provided on both sides in the second direction "X" and thereby the case 3 is structured. In this case, a coil holder 4, a coil 5 and the movable body 6 shown in FIG. 4 and FIG. 5 are accommodated between the first case member 31 and the second case member 32. In this embodiment, both ends in the third direction "Y" of the case 3 are formed to be opening parts.

Both end parts in the third direction "Y" of a pair of the side plate parts 311 of the first case member 31 and a pair of the side plate parts 321 of the second case member 32 are formed with cut-out part 311a, 311b, 321a and 321b. Further, the side plate part 321 is formed with engagement holes 321d at positions separated from each other in the third direction "Y".

As shown in FIG. 5, the coil 5 is an air core coil formed in a ring-shaped planar shape which is wound in an elliptical shape and is held by the coil holder 4. The coil 5 is provided with two long side parts 51, which are arranged in parallel in the second direction "X" and extended in the third direction "Y", and two short side parts 52 in a circular arc shape which are connected with both ends in the third direction "Y" of the two long side parts 51. The long side parts 51 of the coil 5 structured as described above face the first permanent magnet 71 on one side "Z1" in the first direction "Z" and face the second permanent magnet 72 on the other side "Z2" in the first direction "Z".

As shown in FIG. 5 and FIG. 6, the coil holder 4 is provided with a plate part 41 in which a coil arrangement hole 410 formed of an elliptical-shaped through hole where the coil 5 is disposed on an inner side is opened in the first direction "Z".

In an end part 411 on one side "Y1" in the third direction "Y" of the plate part 41, a face of the end part 411 on the other side "Z2" in the first direction "Z" is formed with a plurality of recessed parts 411b extended in the second direction "X", and a face of the end part 411 on one side "Z1" in the first direction "Z" is also formed with recessed parts (not shown) which are similar to the recessed parts 411b.

In the end part 411, a side plate part 413 is protruded from an edge on one side "Y1" in the third direction "Y" toward one side "Z1" in the first direction "Z", and side plate parts 414 and 415 are protruded from an edge on one side "X1" in the second direction "X" and from an edge on the other side "X2" in the second direction "X" toward one side "Z1" and the other side "Z2" in the first direction "Z". The inner faces 414s and 415s of the side plate parts 414 and 415 are formed with first holding parts 414a and 415a which are groove-shaped recessed parts extended in the first direction "Z" on one side "Z1" in the first direction "Z" with respect to the plate part 41. Further, the inner faces 414s and 415s of the side plate parts 414 and 415 are formed with second holding parts 414b and 415b which are groove-shaped recessed parts extended in the first direction "Z" on the other side "Z2" in the first direction "Z" with respect to the plate part 41.

In the end part 412 of the plate part 41 on the other side "Y2" in the third direction "Y", a face of the end part 412 on the other side "Z2" in the first direction "Z" is formed with a plurality of recessed parts 412b extended in the second direction "X", and a face of the end part 412 on one side "Z1" in the first direction "Z" is formed with recessed parts 412a which are similar to the recessed parts 412b.

In the end part 412, side plate parts 417, 418 and 419 are protruded from an edge on the other side "Y2" in the third direction "Y", an edge on one side "X1" in the second direction "X", and an edge on the other side "X2" in the second direction "X" toward one side "Z1" and the other side "Z2" in the first direction "Z". The inner faces 418s and 419s of the side plate parts 418 and 419 are formed with first holding parts 418a and 419a which are groove-shaped recessed parts extended in the first direction "Z" on one side "Z1" in the first direction "Z" with respect to the plate part 41. Further, the inner faces 418s and 419s of the side plate parts 418 and 419 are formed with second holding parts 418b and 419b which are groove-shaped recessed parts extended in the first direction "Z" on the other side "Z2" in the first direction "Z" with respect to the plate part 41.

An end part of an outer face of the side plate part 414 on one side "Y1" in the third direction "Y" is formed with a protruded part 414e which is abutted with the cut-out parts 311a and 321a formed in a pair of the side plate parts 311 of the first case member 31 and formed in a pair of the side plate parts 321 of the second case member 32, and an outer face of the side plate part 415 is also formed with a protruded part 415e which is similar to the protruded part 414e. An end part of an outer face of the side plate part 418 on the other side "Y2" in the third direction "Y" is formed with a protruded part 418e which is abutted with the cut-out parts 311b and 321b formed in a pair of the side plate parts 311 of the first case member 31 and formed in a pair of the side plate parts 321 of the second case member 32, and an outer face of the side plate part 419 is also formed with a protruded part (not shown) which is similar to the protruded part 418e.

Further, the outer face of the side plate part 414 and the outer face of the side plate part 418 are formed with engagement protruded parts 414d and 418d with which the engagement holes 321d formed in each of a pair of the side plate parts 321 of the second case member 32 are engaged. In this case, an outer face of the side plate part 415 and an outer face of the side plate part 419 are formed with engagement protruded parts (not shown) which are similar to the engagement protruded parts 414d and 418d.

[Structure of First Plate 47 and Second Plate 48]

The support body 2 structured as described above includes a first plate 47 which is overlapped with the coil arrangement hole 410 and the plate part 41 from one side "Z1" in the first direction "Z", and the coil 5 is fixed to the first plate 47 and the plate part 41 by an adhesive layer 9 made of an adhesive filled in at least an air core part 50 of the coil 5. Therefore, the coil 5 faces the first permanent magnet 71 in the first direction "Z" through the first plate 47. Further, the first plate 47 is fixed to the plate part 41 by the adhesive layer 9. In this case, the recessed part 412a and the like formed in the plate part 41 serve as a reservoir part of the adhesive layer 9.

Further, the support body 2 includes a second plate 48 which is overlapped with the coil arrangement hole 410 and the plate part 41 from the other side "Z2" in the first direction "Z", and the coil 5 is fixed to the second plate 48 by the adhesive layer 9 made of an adhesive filled in at least the air core part 50 of the coil 5. Therefore, the coil 5 faces the second permanent magnet 72 in the first direction "Z" through the second plate 48. Further, the second plate 48 is fixed to the plate part 41 by the adhesive layer 9. In this case, the recessed parts 411b and 412b and the like formed in the plate part 41 serve as a reservoir part of the adhesive layer 9.

In this embodiment, the first plate 47 and the second plate 48 are made of nonmagnetic material. In this embodiment, the first plate 47 and the second plate 48 are made of a metal plate. More specifically, the first plate 47 and the second plate 48 are made of a nonmagnetic stainless steel plate.

The first plate 47 is provided with first protruded parts 472 in a nail shape which are obliquely protruded from both sides in the second direction "X" to one side "Z1" in the first direction "Z". The first protruded parts 472 are elastically abutted with insides of the first holding parts 414a, 415a, 418a and 419a which are the groove-shaped recessed parts formed in the side plate parts 414, 415, 418 and 419 and thereby the first plate 47 is held by the coil holder 4. Further, the second plate 48 is provided with second protruded parts 482 in a nail shape which are obliquely protruded from both sides in the second direction "X" to the other side "Z2" in the first direction "Z". The second protruded parts 482 are elastically abutted with insides of the second holding parts 414b, 415b, 418b and 419b which are the groove-shaped recessed parts formed in the side plate parts 414, 415, 418 and 419 and thereby the second plate 48 is held by the coil holder 4.

In this embodiment, the first protruded parts 472 and the first holding parts 414a, 415a, 418a and 419a are respectively provided in a plurality of portions corresponding to respective corners of the first plate 47, for example, in four portions. The second protruded parts 482 and the second holding parts 414b, 415b, 418b and 419b are respectively provided in a plurality of portions corresponding to respective corners of the second plate 48, for example, in four portions. Further, the first protruded parts 472, the second protruded parts 482, the first holding parts 414a, 415a, 418a and 419a, and the second holding parts 414b, 415b, 418b and 419b are respectively provided by multiple pieces, for example, two pieces, in each of a plurality of the portions.

In this embodiment, each of the first holding parts 414a, 415a, 418a and 419a is formed to be an open end at an end part on one side "Z1" in the first direction "Z". Further, each of the second holding parts 414b, 415b, 418b and 419b is formed to be an open end at an end part on the other side "Z2" in the first direction "Z".

Therefore, when the first plate 47 is pressed from one side "Z1" in the first direction "Z" so that the first protruded parts 472 at four locations are engaged with the first holding parts 414a, 415a, 418a and 419a, the first plate 47 is held in a state overlapped with the coil arrangement hole 410 and the plate part 41 from one side "Z1" in the first direction "Z" by the first holding parts 414a, 415a, 418a and 419a. Further, when the second plate 48 is pressed from the other side "Z2" in the first direction "Z" so that the second protruded parts 482 at four locations are engaged with the second holding parts 414b, 415b, 418b and 419b, the second plate 48 is held in a state overlapped with the coil arrangement hole 410 and the plate part 41 from the other side "Z2" in the first direction "Z" by the second holding parts 414b, 415b, 418b and 419b. Therefore, the first plate 47 and the second plate 48 can be easily fitted to the coil holder 4.

As described above, in the actuator 1 in this embodiment, the coil 5 is disposed on an inner side of the coil arrangement hole 410 penetrated through the plate part 41 of the coil holder 4 in the first direction "Z", and the first plate 47 is disposed so as to overlap with the coil arrangement hole 410 and the plate part 41 from one side "Z1" in the first direction "Z". Therefore, when the air core part 50 of the coil 5 is filled with an adhesive, the adhesive is flowed into between the coil 5 and the coil holder 4, between the coil 5 and the first plate 47, and between the first plate 47 and the coil holder 4. Accordingly, when the adhesive is cured, the coil 5, the first plate 47 and the coil holder 4 are fixed to each other by the adhesive layer 9. As a result, different from a case that an adhesive is flowed into a gap space between an outer peripheral face of the coil 5 and an inner peripheral face of the coil arrangement hole 410, the coil 5 disposed in the coil arrangement hole 410 of the coil holder 4 can be adhesively bonded to the coil holder 4 appropriately. Further, the first plate 47 is disposed between the first permanent magnet 71 and the coil 5. Therefore, even in a case that the movable body 6 is moved to one side "Z1" in the first direction "Z", the first permanent magnet 71 and the coil 5 are not directly contacted with each other and thus the coil 5 is hard to be damaged.

Further, when the second plate 48 is overlapped after the air core part 50 of the coil 5 has been filled with the adhesive, the adhesive is smoothly flowed into between the coil 5 and the coil holder 4, between the coil 5 and the first plate 47, and between the first plate 47 and the coil holder 4 and, in addition, the adhesive is flowed into between the coil 5 and the second plate 48 and between the second plate 48 and the coil holder 4. Therefore, when the adhesive is cured, the coil 5, the first plate 47, the second plate 48 and the coil holder 4 are fixed to each other by the adhesive layer 9. In this state, the second plate 48 is disposed between the second permanent magnet 72 and the coil 5. Therefore, even in a case that the movable body 6 is moved to the other side "Z2" in the first direction "Z", the second permanent magnet 72 and the coil 5 are not directly contacted with each other and thus the coil 5 is hard to be damaged.

Further, the first plate 47 and the second plate 48 are made of nonmagnetic material and thus, a magnetic flux from the first permanent magnet 71 and a magnetic flux from the second permanent magnet 72 are interlinked with the coil 5 without being affected by the first plate 47 and the second plate 48. Further, the first plate 47 and the second plate 48 are made of a metal plate and thus, heat generated in the coil 5 can be efficiently dissipated through the first plate 47 and the second plate 48. Further, the first plate 47 and the second plate 48 are made of a stainless steel plate and thus, even when plate thicknesses of the first plate 47 and the second plate 48 are thin, they have sufficient strength.

The coil holder 4 is provided with the first holding parts 414a, 415a, 418a and 419a, which are engaged with the first protruded parts 472 in a nail shape of the first plate 47 to hold the first plate 47, and the second holding parts 414b, 415b, 418b and 419b which are engaged with the second protruded parts 482 in a nail shape of the second plate 48 to hold the second plate 48. Therefore, the first plate 47 and the second plate 48 are not required to be supported by a jig until the adhesive 90 is cured.

[Structure of Connection Bodies 91 and 92]

As shown in FIG. 2 through FIG. 5, the movable body 6 is supported so as to be movable in the second direction "X" and the third direction "Y" by connection bodies 91 and 92 provided between the movable body 6 and the support body 2.

In this embodiment, the connection body 91 is provided in a portion where the first yoke 81 and the first plate 47 are faced each other in the first direction "Z". The connection body 92 is provided in a portion where the second yoke 82 and the second plate 48 are faced each other in the first direction "Z". More specifically, the connection body 91 is provided in a portion where the first yoke 81 and the first plate 47 are faced each other in the first direction "Z" at each of two positions separated in the third direction "Y" (each side of the short side parts 52 of the coil 5). The connection body 92 is provided in a portion where the second yoke 82 and the second plate 48 are faced each other in the first direction "Z" at each of two positions separated in the third direction "Y" (each side of the short side parts 52 of the coil 5). Therefore, the movable body 6 can be supported movable in the second direction "X" without using a plate-shaped spring or the like.

In this embodiment, the connection bodies 91 and 92 are viscoelastic members. More specifically, the connection bodies 91 and 92 (viscoelastic members) are made of a gel member such as silicone gel. In this embodiment, the connection bodies 91 and 92 are made of silicone gel having a penetration degree in a range of 90 degrees to 110 degrees. A penetration degree is, as defined in JIS-K-2207 and JIS-K-2220, a value expressed in units of $1/10$ mm of an entering depth of a needle of a $1/4$ cone for five seconds when a total load of 9.38 g is applied to the $1/4$ cone at 25° C. The penetration degree means that the silicone gel is harder as the value is smaller. In this embodiment, fixing of the connection bodies 91 and 92 to the first yoke 81 and the second yoke 82, and fixing of the connection bodies 91 and 92 to the coil holder 4 are performed by utilizing an adhesive or adhesiveness of silicone gel.

As described above, in the actuator 1 in this embodiment, the connection bodies 91 and 92 are provided between the movable body 6 and the support body 2 and thus resonance of the movable body 6 can be suppressed. In this embodiment, the connection bodies 91 are provided between the first plate 47 and the first yoke 81, and the connection bodies 92 are provided between the second plate 48 and the second yoke 82. Therefore, the case 3 is not used for providing the connection bodies 91 and 92. Accordingly, the connection bodies 91 and 92 can be provided between the support body 2 and the movable body 6 without using the case 3. As a result, the connection bodies 91 and 92 can be provided in a middle stage of assembling when the case 3 is not provided and thus, vibration characteristics including a damper characteristic can be measured in the middle of production. Further, since the case 3 is not used for providing the connection bodies 91 and 92, the connection bodies 91 and 92 can be provided in an actuator which does not have a case 3.

Further, the connection bodies 91 and 92 are provided between the support body 2 and the movable body 6 at positions facing in the first direction "Z" intersecting the second direction "X" (vibration direction) and thus, when the movable body 6 is vibrated in the second direction "X", the connection bodies 91 and 92 are deformed in the shearing direction to prevent resonance. Therefore, even when the movable body 6 is vibrated in the second direction "X", a change of an elastic modulus of each of the connection bodies 91 and 92 is small and thus resonance of the movable body 6 can be effectively suppressed.

In other words, the connection body (connection bodies 91 and 92) is a viscoelastic member (plate-shaped gel member) which is provided with linearly or nonlinearly expansion and contraction characteristics according to the expansion and contraction direction. For example, the connection bodies 91 and 92 are provided with an expansion and contraction characteristic in which, when pressed in its thickness direction (axial direction) and compressively deformed, a non-linear component (spring coefficient) is larger than a linear component. On the other hand, when pulled and extended in the thickness direction (axial direction), the connection bodies 91 and 92 are provided with an expansion and contraction characteristic in which a linear component (spring coefficient) is larger than a non-linear component (spring coefficient). Further, in a case that the connection bodies 91 and 92 are deformed in a direction (shearing direction) intersecting the thickness direction (axial direction), even when moved in either direction, the connection bodies 91 and 92 are deformed in a pulled and extended direction and thus, the connection bodies 91 and 92 are provided with a deformation characteristic in which a linear component (spring coefficient) is larger than a non-linear component (spring coefficient). In this embodiment, when the movable body 6 is vibrated in the second direction "X", the connection bodies 91 and 92 are structured so as to deform in a shearing direction. Therefore, when the movable body 6 is vibrated in the second direction "X", spring forces of the connection bodies 91 and 92 in a direction of motion become constant. Accordingly, reproducibility of vibrational acceleration with respect to an input signal can be improved by using spring elements in the shearing direction of the connection bodies 91 and 92 and thus, vibration can be realized with a delicate nuance.

Further, both faces in the first direction "Z" of each of the connection bodies 91 and 92 are connected with the movable body 6 and the support body 2 by a method such as adhesion. Therefore, the connection bodies 91 and 92 surely follow a movement of the movable body 6 and thus, resonance of the movable body 6 can be prevented effectively.

Further, the connection bodies 91 and 92 are set in a state that they are compressed between the support body 2 and the movable body 6 in the first direction "Z". Therefore, the connection bodies 91 and 92 surely follow a movement of the movable body 6 and thus, resonance of the movable body 6 can be prevented effectively.

[Structure of Abutting Part]

In this embodiment, an abutting part is provided which restricts a movable range of the movable body 6 when the movable body 6 is moved in the second direction "X" and the third direction "Y" due to an impact from the outside. More specifically, in the movable body 6, the flat plate parts 811 and 821 of the first yoke 81 and the second yoke 82 are faced to the inner faces 414s, 415s, 418s and 419s of the side plate parts 414, 415, 418 and 419 in the second direction "X". The inner faces 414s, 415s, 418s and 419s of the side plate parts 414, 415, 418 and 419 serve as a first abutting part which is abutted with the movable body 6 when the movable body 6 is moved in the second direction "X" due to an impact from the outside to restrict a movable range in the second direction "X".

Further, in the movable body 6, a pair of the connecting parts 812 of the first yoke 81 and a pair of the projecting parts 822 of the second yoke 82 are respectively located between the side plate part 414 and the side plate part 418 of the coil holder 4 separated from each other in the third direction "Y" and between the side plate part 415 and the side plate part 419 of the coil holder 4 separated from each other in the third direction "Y". Therefore, end parts 414g and 418g facing each other in the side plate part 414 and the side plate part 418, and end parts 415g and 419g facing each other in the side plate part 415 and the side plate part 419 serve as a second abutting part which is abutted with the movable body 6 when the movable body 6 is moved in the third direction "Y" due to an impact from the outside to restrict a movable range in the third direction "Y".

[Structure of Power Feeding Circuit Board 10]

Figure 7:
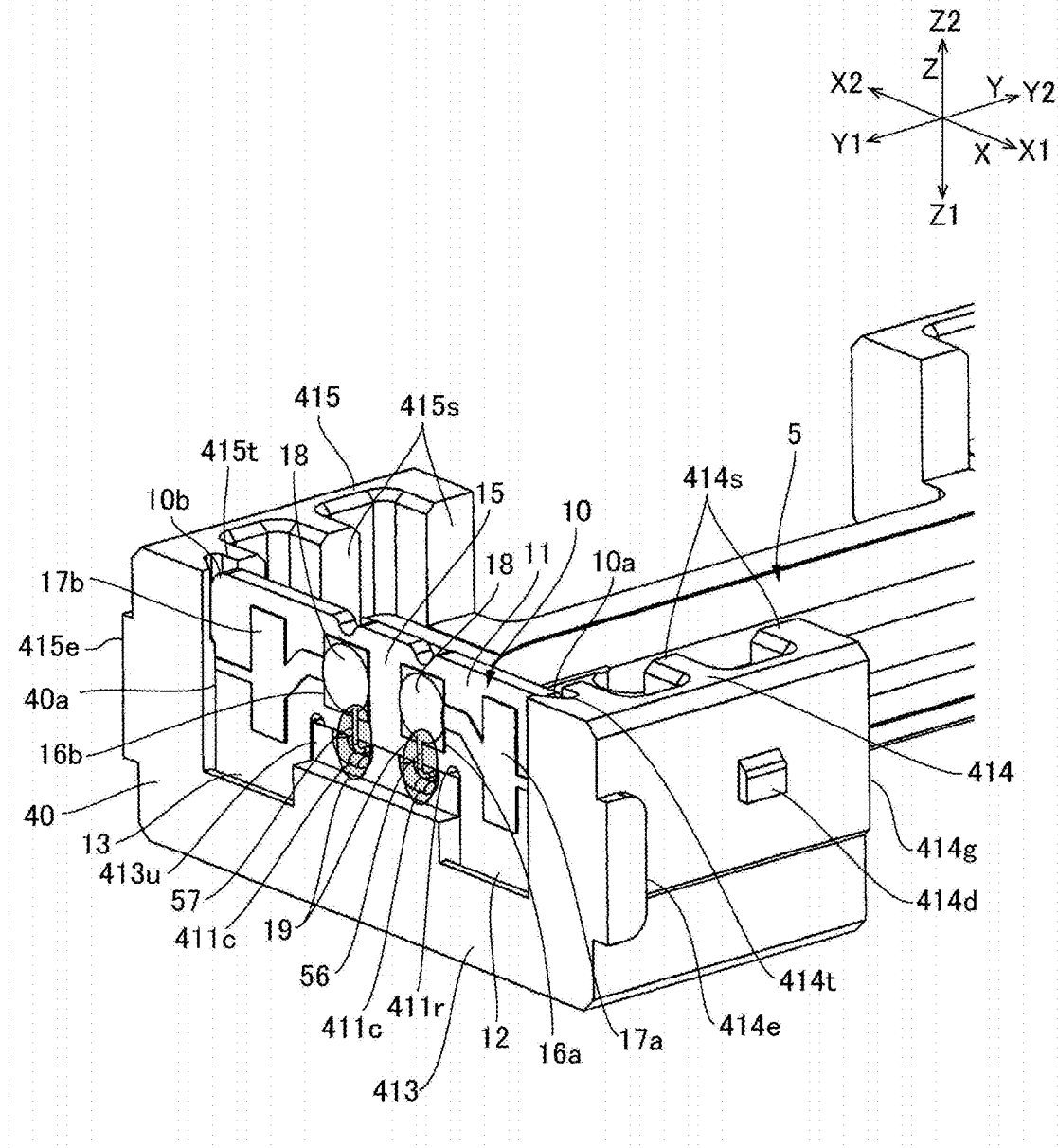
FIG. 7 is an explanatory view showing a fixing structure of a power feeding circuit board in the actuator 1 shown in FIG. 1.
Figure 8:
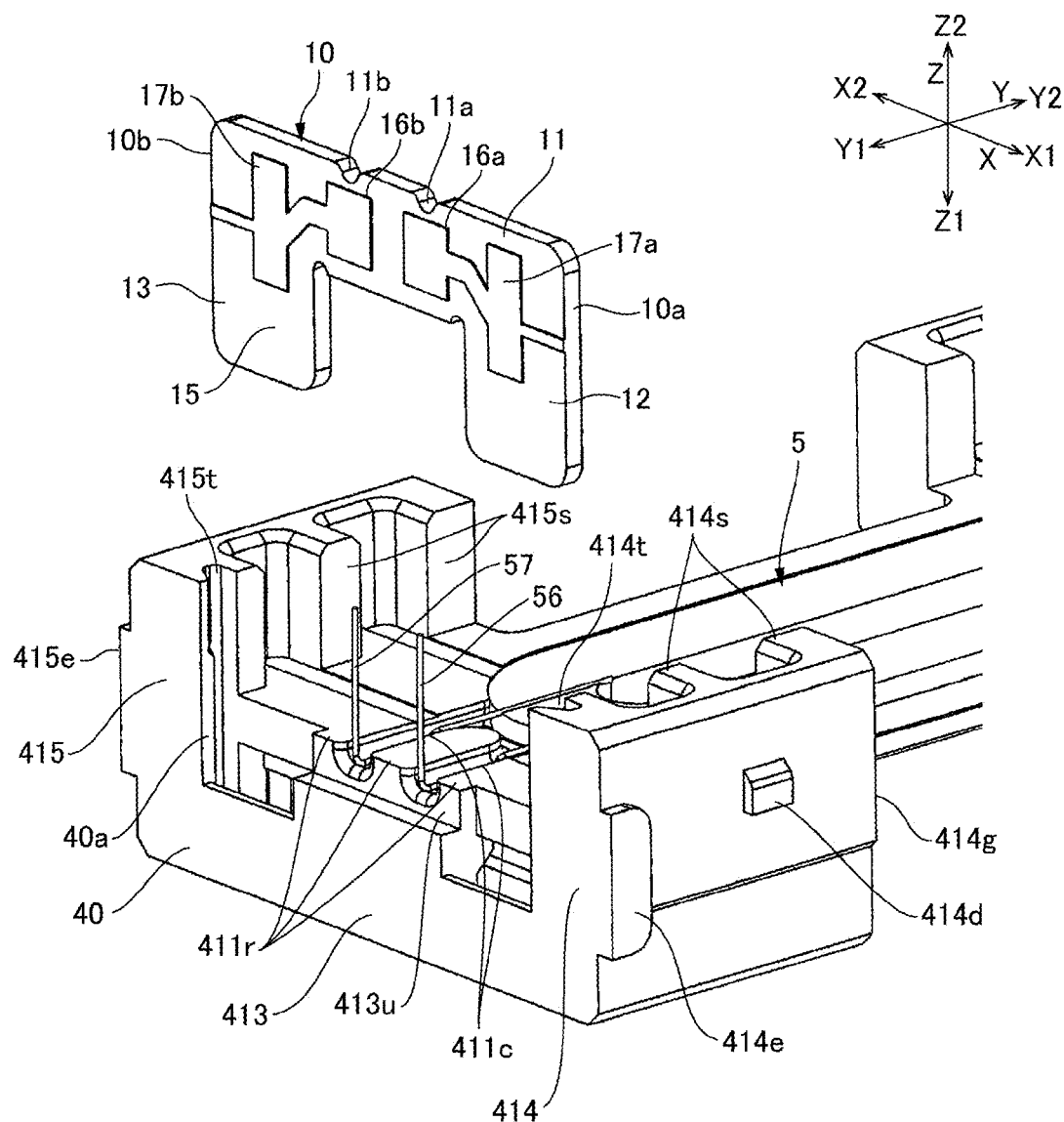
FIG. 8 is an explanatory view showing a slit which holds the power feeding circuit board shown in FIG. 7.

FIG. 7 is an explanatory view showing a fixing structure of a power feeding circuit board 10 in the actuator 1 shown in FIG. 1. FIG. 8 is an explanatory view showing slits 414t and 415t which hold the power feeding circuit board 10.

As shown in FIG. 1 and FIG. 3, in the actuator 1, a power feeding circuit board 10 is held at a position in the coil holder 4 separated from the above-mentioned abutting parts (inner faces 414s, 415s, 418s and 419s and end parts 414g, 415g, 418g and 419g of the side plate parts 414, 415, 418 and 419), and the power feeding circuit board 10 is connected with coil wires 56 and 57 structuring the coil 5 by soldering or the like. In this embodiment, the power feeding circuit board 10 is a rigid circuit board.

As shown in FIG. 7 and FIG. 8, the side plate parts 413, 414 and 415 of the coil holder 4 structure the end face 40 on one side "Y1" in the third direction "Y", and the end face 40 determines an outside dimension in the third direction "Y" of the coil holder 4. Further, the end face 40 structures an end face of the support body 2 and determines an outside dimension in the third direction "Y" of the support body 2. In addition, the end face 40 structures an end face of the actuator 1 and determines an outside dimension in the third direction "Y" of the actuator 1. In this embodiment, the power feeding circuit board 10 is held in an opening part 40a of the end face 40 of the coil holder 4 which is surrounded by the side plate parts 413, 414 and 415 on one side "Y1" in the third direction "Y". In this embodiment, the coil wires 56 and 57 are extended from the coil 5 to one side "Y1" in the third direction "Y" through two guide grooves 411c formed on the other side "Z2" face in the first direction "Z" of the end part 411 of the plate part 41 of the coil holder 4 and then, the coil wires 56 and 57 are extended from one side "Z1" toward the other side "Z2" in the first direction "Z" and are connected with the power feeding circuit board 10.

The coil holder 4 is formed with a step part 413u which is retracted from the end face 40 and the guide grooves 411c are opened in the step part 413u.

In this embodiment, the coil holder 4 is formed with a pair of slits 414t and 415t which are extended to one side "Z1" in the first direction "Z" in end parts 414h and 415h of the side plate parts 414 and 415 facing each other in the second direction "X", and end parts 10a and 10b on both sides in the second direction "X" of the power feeding circuit board 10 are fitted to inner sides of slits 414t and 415t. Therefore, the power feeding circuit board 10 is held by the coil holder 4 at a position exposed from the case 3 along the end face 40 (side plate parts 413, 414 and 415) of the coil holder 4. This embodiment is structured so that, after the end parts 10a and 10b of the power feeding circuit board 10 are fitted to the slits 414t and 415t, the coil holder 4 and the power feeding circuit board 10 are fixed to each other with an adhesive to restrain vibration of the power feeding circuit board 10.

In this embodiment, the power feeding circuit board 10 is provided with a first plate part 11 formed with two lands 16a and 16b with which the coil wires 56 and 57 are connected by solders 18 at positions separated in the second direction "X", and two second plate parts 12 and 13 which are protruded from both ends in the second direction "X" of the first plate part 11 to one side "Z1" in the first direction "Z". Further, the first plate part 11 is formed with two lands 17a and 17b on both sides with respect to the lands 16a and 16b, and wiring members (not shown) from the outside are connected with the lands 17a and 17b. Each of the lands 16a, 16b, 17a and 17b is formed on one face 15 of the power feeding circuit board 10, and the power feeding circuit board 10 is fixed to the coil holder 4 with the one face 15 facing an outer side. In this state, the one face 15 of the power feeding circuit board 10 and the step part 413u are located on the same imaginary plane.

The end part 411 of the coil holder 4 is formed with an abutting part 411r which is capable of receiving an edge of the first plate part 11 of the power feeding circuit board 10 on one side "Z1" in the first direction "Z" at a position where end parts of the guide grooves 411c are passed on one side "Y1" in the third direction "Y". Both end parts 10a and 10b of the power feeding circuit board 10 are fitted to the slits 414t and 415t and are reached to a depth position where the first plate part 11 of the power feeding circuit board 10 is abutted with the abutting part 411r. An end part of the first plate part 11 on the other side "Z2" in the first direction "Z" is formed with two recessed parts 11a and 11b for holding tip end sides of the coil wires 56 and 57 when the coil wires 56 and 57 are to be connected with the power feeding circuit board 10.

Widths of the slits 414t and 415t are set to be narrower from a midway in a depth direction (first direction "Z"). Therefore, when both end parts 10a and 10b of the power feeding circuit board 10 are inserted into the slits 414t and 415t, the power feeding circuit board 10 can be maintained in a held state by the slits 414t and 415t even at a midway position before the first plate part 11 is abutted with the abutting part 411r.

The coil wires 56 and 57 are provided with appropriate slacks in portions between from the coil 5 to the lands 16a and 16b (connecting position) of the power feeding circuit board 10. However, when the power feeding circuit board 10 is moved to a depth position where the power feeding circuit board 10 is separated from the abutting part 411r to the other side "Z2" in the first direction "Z" in a state that the power feeding circuit board 10 is fitted in the slits 414t and 415t, the coil wires 56 and 57 become in a tension state.

As described above, in this embodiment, the power feeding circuit board 10 is held by the coil holder 4 which is covered by the case 3 and thus, an impact in falling is hard to be transmitted to the power feeding circuit board 10 over the case 3. Further, even when an impact in falling is transmitted to the coil holder 4, the power feeding circuit board 10 is moved together with the coil holder 4 and thus, the coil wires 56 and 57 are less likely pulled. Therefore, the coil wires 56 and 57 are hardly disconnected due to an impact in falling and thus, falling impact-resistant performance can be enhanced.

Further, the power feeding circuit board 10 is provided along the side face of the coil holder 4. Therefore, a situation that an impact in falling is directly applied to the power feeding circuit board 10 is hard to occur and thus, a situation that the coil wires 56 and 57 are disconnected due to an impact in falling is hard to occur.

Further, in the coil holder 4, the power feeding circuit board 10 is provided at a position separated from the abutting part for the movable body 6 (the inner faces 414s, 415s, 418s and 419s (first abutting part) of the side plate parts 414, 415, 418 and 419 and the end parts 414g, 415g, 418g and 419g (second abutting part) of the side plate parts 414, 415, 418 and 419). Therefore, even when the movable body 6 is moved due to an impact in falling and the movable body 6 is abutted with the abutting part of the coil holder 4, the impact is hard to be transmitted to the power feeding circuit board 10. Accordingly, a situation that the coil wires 56 and 57 are disconnected due to an impact in falling is hard to occur.

The side face of the coil holder 4 to which the power feeding circuit board 10 is fixed is located on one side "Y1" in the third direction "Y". In this embodiment, the short side parts 52 of the coil 5 (ineffective side) are located in the third direction "Y". Further, the coil wires 56 and 57 of the coil 5 are extended from the short side part 52 of the coil 5. Therefore, when the power feeding circuit board 10 is disposed in the side face of the coil holder 4 located on one side "Y1" in the third direction "Y", a distance where the coil wires 56 and 57 are extended from the coil 5 to the power feeding circuit board 10 can be shortened.

Further, the coil wires 56 and 57 are extended from one side "Z1" to the other side "Z2" in the first direction "Z" and are connected with the power feeding circuit board 10, and both end parts 10a and 10b of the power feeding circuit board 10 are fitted from the other side "Z2" in the first direction "Z" to the inner sides of a pair of the slits 414t and 415t of the coil holder 4 which are extended toward one side "Z1" in the first direction "Z" at positions facing each other. In this embodiment, the power feeding circuit board 10 is fitted to the slits 414t and 415t to a depth that the power feeding circuit board 10 is abutted with the abutting part 411r provided in the coil holder 4 from the other side "Z2" in the first direction "Z" and is located on the most one side "Z1" in the first direction "Z". Therefore, the coil wires 56 and 57 extended from one side "Z1" to the other side "Z2" in the first direction "Z" can be easily provided with appropriate slacks. Accordingly, in a case that temperature change occurs, even when a situation or the like occurs that the coil wires 56 and 57 are pulled between the coil wires 56 and 57 and peripheral members due to a difference of thermal expansion coefficients, the coil wires 56 and 57 are hard to be disconnected. As a result, an usable temperature range of the actuator 1 can be enlarged.

In this embodiment, the power feeding circuit board 10 is fixed to the coil holder 4 in a state that one face 15 of the power feeding circuit board 10 is retracted from the end face 40. Further, the coil wires 56 and 57 are provided with slack portions between the coil 5 and connected positions with the power feeding circuit board 10, and the slack portions are fixed to the one face 15 of the power feeding circuit board 10 with an adhesive 19. In this embodiment, the slack portions of the coil wires 56 and 57 are located between the step part 413*u* and the power feeding circuit board 10 and thus, the adhesive 19 fixes the slack portion to the step part 413*u* and the one face 15 of the power feeding circuit board 10.

As described above, in this embodiment, the power feeding circuit board 10 is disposed along the end face 40 of the coil holder 4, and the one face 15 of the power feeding circuit board 10 is set in a retracted state from the end face 40. Therefore, even in a case that the power feeding circuit board 10 is fixed to the coil holder 4, the outside dimensions in the third direction "Y" of the coil holder 4, the support body 2 and the actuator 1 can be reduced.

Further, the one face 15 of the power feeding circuit board 10 is retracted from the end face 40 and thus, even when the coil wires 56 and 57 are connected with the lands 16*a* and 16*b* by the solders 18, the solders 18 are not greatly protruded from the end face 40. In this embodiment, the solders 18 are located at the positions retracted from the end face 40. Therefore, the outside dimensions in the third direction "Y" of the coil holder 4, the support body 2 and the actuator 1 can be reduced.

Further, the slack portions are provided in the coil wires 56 and 57 and thus, in a process of assembling the actuator 1, the coil wires 56 and 57 are hardly disconnected. Further, the slack portions are fixed to the one face 15 of the power feeding circuit board 10 with the adhesives 19 and thus, after the actuator 1 has been assembled, the slack portions are hardly protruded from the end face 40. Further, the one face 15 of the power feeding circuit board 10 is retracted from the end face 40 and thus, the adhesives 19 are not greatly protruded from the end face 40. In this embodiment, the adhesives 19 are located at the positions retracted from the end face 40. Therefore, the outside dimensions in the third direction "Y" of the coil holder 4, the support body 2 and the actuator 1 can be reduced.

[Operation]

In the actuator 1 in this embodiment, when electrical power is supplied from the outside (host apparatus) to the coil 5 through the power feeding circuit board 10, the movable body 6 is reciprocated in the second direction "X" by a magnetic drive circuit 1*a* structured of the coil 5, the first permanent magnet 71 and the second permanent magnet 72. Therefore, a user who holds the actuator 1 by hand can obtain information through vibration of the actuator 1. In this case, in a signal waveform which is applied to the coil 5, its frequency is varied according to information to be transmitted. Further, the polarity of the signal waveform which is applied to the coil 5 is reversed and, in this case, the voltage is provided with a difference so as to be changed slowly or quickly between times when polarity of the drive signal is in a negative period or a positive period. As a result, a difference is generated between acceleration when the movable body 6 is moved to one side "X1" in the second direction "X" and acceleration when the movable body 6 is moved to the other side "X2" in the second direction "X". Therefore, the user can obtain a feeling such that the actuator 1 is moved to one side "X1" or to the other side "X2" in the second direction

[Manufacturing Method for Actuator 1]

Figure 9:
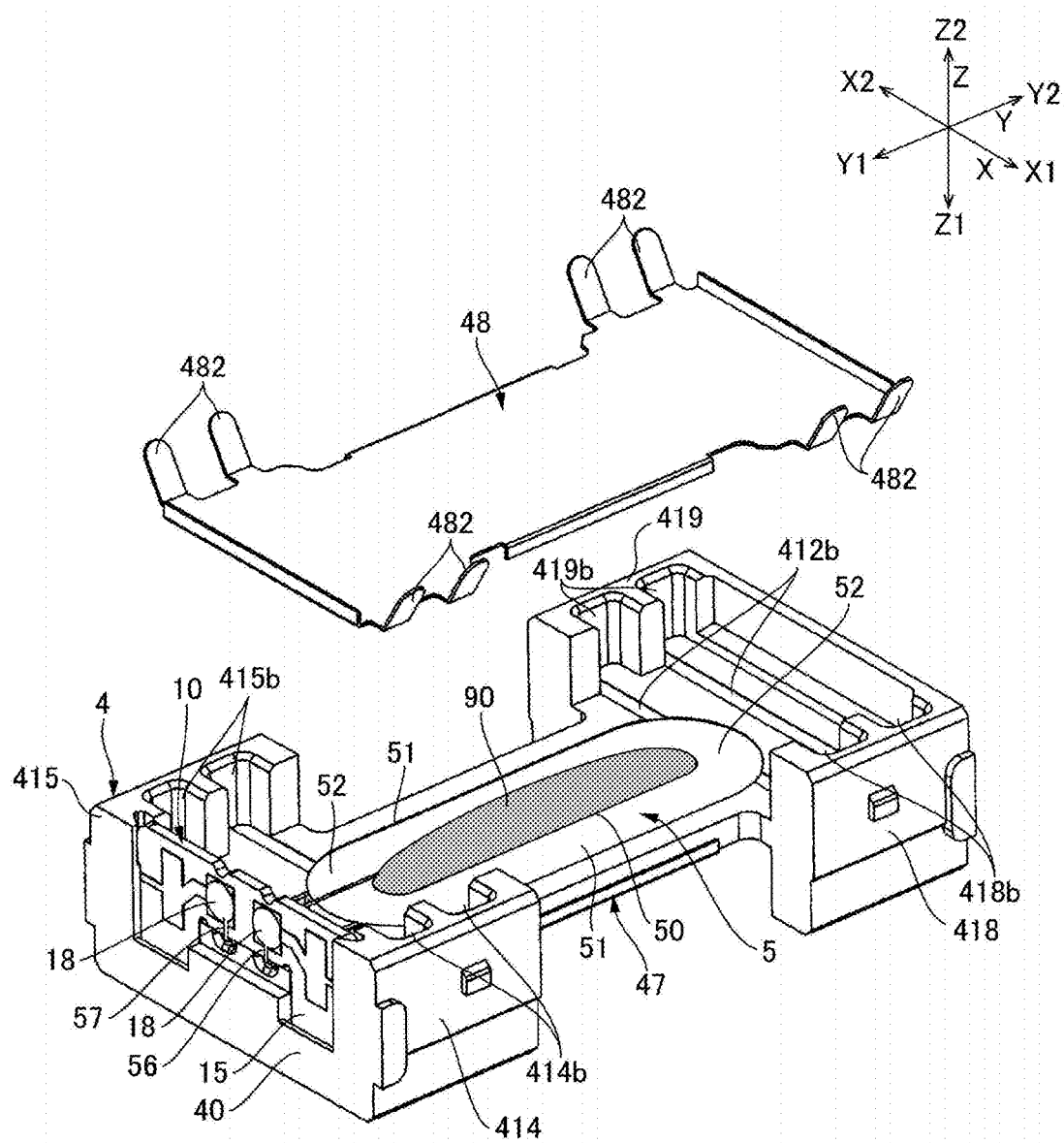
FIG. 9 is an explanatory view showing a process in which a coil is fixed to a coil holder in a manufacturing process for the actuator shown in FIG. 1.
Figure 10:
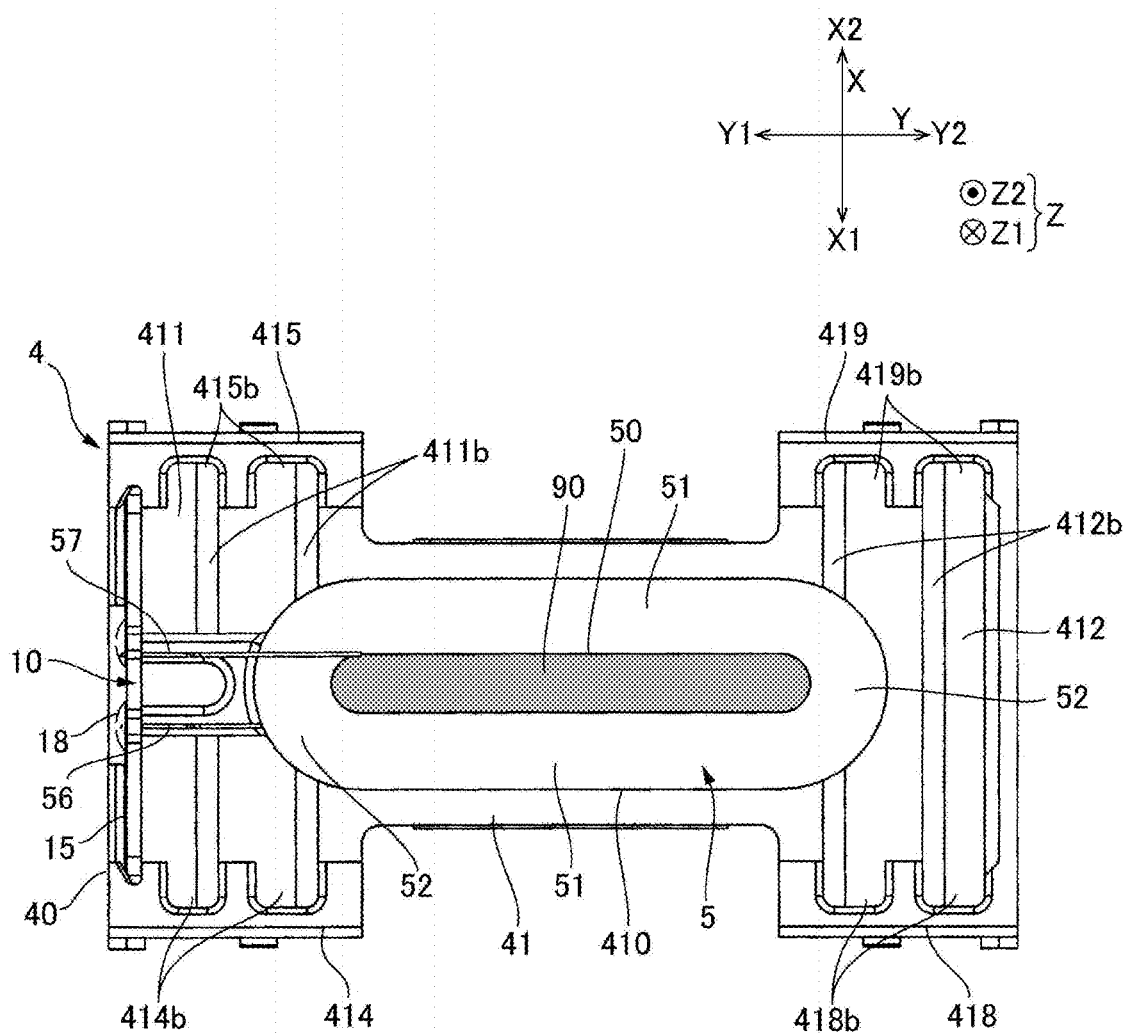
FIG. 10 is a plan view showing a process in which a coil is fixed to the coil holder shown in FIG. 5.
Figure 11A:
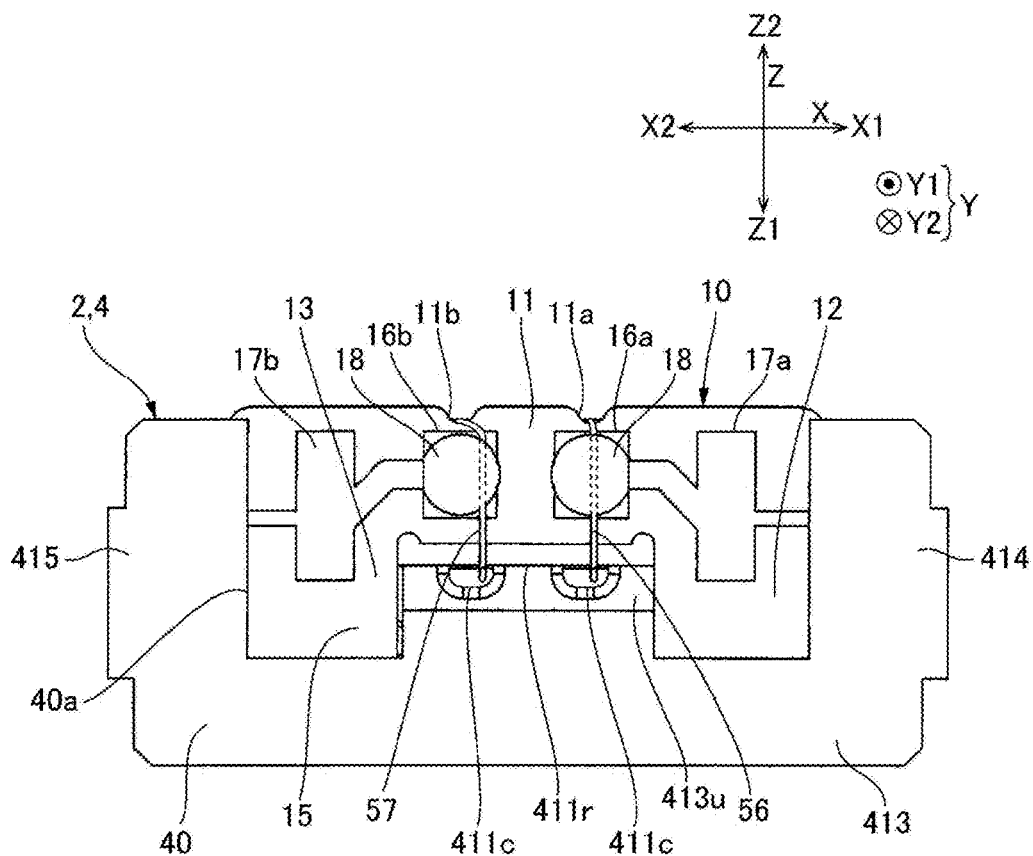
FIG. 11A and FIG. 11B are explanatory views showing a process in which a power feeding circuit board is fixed to the coil holder shown in FIG. 5.
Figure 11B:
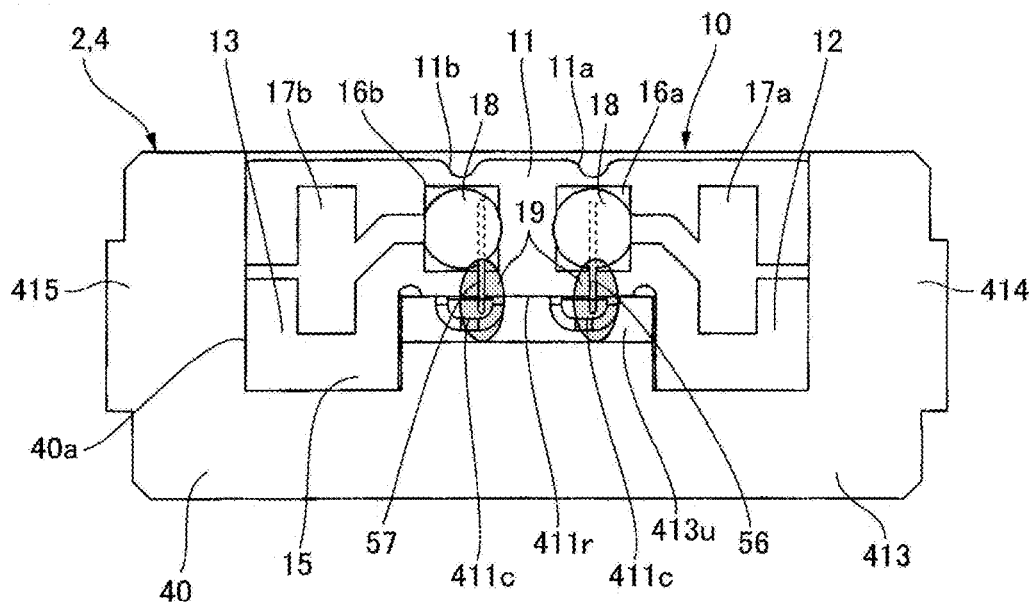

FIG. 9 is an explanatory view showing a process in which the coil 5 is fixed to the coil holder 4 in a manufacturing process for the actuator 1 shown in FIG. 1. FIG. 10 is a plan view showing a process in which the coil 5 is fixed to the coil holder 4 shown in FIG. 5. FIG. 11A and FIG. 11B are explanatory views showing a process in which the power feeding circuit board 10 is fixed to the coil holder 4 shown in FIG. 5.

When the actuator 1 is to be manufactured, first, as shown in FIG. 9 and FIG. 10, the first plate 47 is disposed to the coil arrangement hole 410 and the plate part 41 of the coil holder 4 so as to overlap from one side "Z1" in the first direction "Z". In this case, the first protruded parts 472 are inserted and engaged with the first holding parts 414*a*, 415*a*, 418*a* and 419*a* of the side plate parts 414, 415, 418 and 419. As a result, the first plate 47 is held by the coil holder 4 in a state that the coil arrangement hole 410 is closed from one side "Z1" in the first direction "Z". Next, as shown in FIG. 9 and FIG. 10, the coil 5 is disposed in the coil arrangement hole 410.

In this state, as shown in FIG. 7, the power feeding circuit board 10 is fixed to the coil holder 4. In this embodiment, as shown in FIG. 11A, the end parts 10*a* and 10*b* of the power feeding circuit board 10 are fitted to the slits 414*t* and 415*t* of the coil holder 4 from the other side "Z2" in the first direction "Z". In this case, the insertion of the power feeding circuit board 10 is stopped at a midway position before the power feeding circuit board 10 is abutted with the abutting part 411*r* of the coil holder 4 from the other side "Z2" in the first direction "Z". Therefore, the power feeding circuit board 10 is set in a separated and floated state from the abutting part 411*r*.

In this state, the coil wires 56 and 57 are brought to the other side "Z2" from one side "Z1" in the first direction "Z" and are connected with the lands 16*a* and 16*b* of the power feeding circuit board 10 with the solders 18. In this case, the coil wires 56 and 57 are passed through the recessed parts 11*a* and 11*b* to position the coil wires 56 and 57. After the coil wires 56 and 57 are connected with the power feeding circuit board 10, surplus portions of the tip end sides of the coil wires 56 and 57 are cut and removed.

After that, the power feeding circuit board 10 is pushed in the slits 414*t* and 415*t* to a depth that the power feeding circuit board 10 is abutted with the abutting part 411*r* from the other side "Z2" in the first direction "Z". As a result, the coil wires 56 and 57 are provided with appropriate slacks between the coil 5 and the lands 16*a* and 16*b* (connected position) of the power feeding circuit board 10. In this embodiment, after the power feeding circuit board 10 is pushed in the slits 414*t* and 415*t* to the depth that the power feeding circuit board 10 is abutted with the abutting part 411*r* from the other side "Z2" in the first direction "Z", the power feeding circuit board 10 is fixed to the coil holder 4 with an adhesive.

The widths of the slits 414*t* and 415*t* are set to be narrow from a midway position in the depth direction and thus, when the power feeding circuit board 10 is inserted into the slits 414t and 415t to a position where the widths become narrow, the power feeding circuit board 10 is temporarily fixed to the slits 414t and 415t. Therefore, after the coil wires 56 and 57 are connected with the power feeding circuit board 10 which is temporarily fixed, when the power feeding circuit board 10 is further deeply pushed into the slits 414t and 415t, the coil wires 56 and 57 can be provided with slacks. Further, when a position of the power feeding circuit board 10 at the time of connecting with the coil wires 56 and 57 is set to be adequate, the slacks provided in the coil wires 56 and 57 can be made adequate. After that, the slack portions of the coil wires 56 and 57 are fixed to the step part 413u and the one face 15 of the power feeding circuit board 10 with the adhesives 19.

Next, as shown in FIG. 9 and FIG. 10, after the air core part 50 of the coil 5 is filled with an adhesive, the second plate 48 is disposed so as to overlap with the coil arrangement hole 410 and the plate part 41 of the coil holder 4 from the other side "Z2" in the first direction "Z". In this case, the second protruded parts 482 are inserted and engaged with the second holding parts 414b, 415b, 418b and 419b of the side plate parts 414, 415, 418 and 419. As a result, the second plate 48 is held by the coil holder 4 in a state overlapped with the coil 5 from the other side "Z2" in the first direction "Z". Further, on one side "Z1" in the first direction "Z" with respect to the coil 5, the adhesive 90 is flowed into a gap space between the first plate 47 and the plate part 41 of the coil holder 4 through between the coil 5 and the first plate 47. In this case, the excessive adhesive 90 is flowed into the recessed parts 412a and the like formed on the one side "Z1" face in the first direction "Z" of the end parts 411 and 412 of the plate part 41. On the other hand, on the other side "Z2" in the first direction "Z" with respect to the coil 5, the adhesive 90 is flowed into a gap space between the second plate 48 and the plate part 41 of the coil holder 4 through between the coil 5 and the second plate 48. In this case, the excessive adhesive 90 is flowed into the recessed parts 411b and 412b and the like formed on the other side "Z2" face in the first direction "Z" of the end parts 411 and 412 of the plate part 41.

Therefore, when the adhesive 90 is cured, the coil 5 is fixed to the first plate 47 and the plate part 41 of the coil holder 4 by the adhesive layer 9 made of the adhesive 90 having been cured. Further, the first plate 47 is fixed to the plate part 41 of the coil holder 4 by the adhesive layer 9. Further, the coil 5 is fixed to the first plate 47 by the adhesive layer 9, and the second plate 48 is fixed to the plate part 41 of the coil holder 4 by the adhesive layer 9.

Next, the connection body 91 is adhesively bonded to a face of the first plate 47 on one side "Z1" in the first direction "Z" at two positions separated in the third direction "Y", and the connection body 92 is adhesively bonded to a face of the second plate 48 on the other side "Z2" in the first direction "Z" at two positions separated in the third direction "Y".

Next, the first yoke 81 to which the first permanent magnet 71 is fixed is disposed on one side "Z1" in the first direction "Z" with respect to the first plate 47, and the second yoke 82 to which the second permanent magnet 72 is fixed is disposed on the other side "Z2" in the first direction "Z" with respect to the second plate 48 and then, the tip end parts of the connecting parts 812 of the first yoke 81 are connected with the projecting parts 822 of the second yoke 82 by a method such as welding. In this case, the connection bodies 91 are adhesively bonded to the first yoke 81 and the connection bodies 92 are adhesively bonded to the second yoke 82.

Next, after the first case member 31 is overlapped with the coil holder 4 and the movable body 6 so as to cover from one side "Z1" in the first direction "Z", the second case member 32 is overlapped with the coil holder 4 and the movable body 6 so as to cover from the other side "Z2" in the first direction "Z", and the engagement holes 321d formed in the side plate part 321 of the second case member 32 are engaged with the engagement protruded parts 414d and 418d and the like of the coil holder 4. After that, the first case member 31 and the second case member 32 are joined to each other by welding or the like to structure the case 3.

OTHER EMBODIMENTS

In the embodiment described above, the permanent magnet (first permanent magnet 71 and second permanent magnet 72) are provided on both sides in the first direction "Z" with respect to the coil 5. However, the present invention may be applied to an actuator which includes a permanent magnet on only one side in the first direction "Z" with respect to the coil 5.

In the embodiment described above, the coil holder 4 and the coil 5 are provided in the support body 2, and the permanent magnet (first permanent magnet 71 and second permanent magnet 72) and the yoke (first yoke 81 and second yoke 82) are provided in the movable body 6. However, the structure using the first plate 47 and the second plate 48 and the structure for providing slacks in the power feeding circuit board 10 may be applied to an actuator in which the coil holder 4 and the coil 5 are provided in the movable body 6, and the permanent magnet (first permanent magnet 71 and second permanent magnet 72) and the yoke (first yoke 81 and second yoke 82) are provided in the support body 2.

In the embodiment described above, a gel member (viscoelastic member) is used as the connection bodies 91 and 92, but rubber, a spring or the like may be used. In this case, viscoelasticity is a property provided with both of viscosity and elasticity and remarkably found in high molecular material such as gel member, plastic and rubber. Therefore, various rubber materials such as natural rubber, diene-based rubber (for example, styrene butadiene rubber, isoprene rubber, butadiene rubber, chloroprene rubber, acrylonitrile butadiene rubber), non-diene-based rubber (for example, butyl rubber, ethylene propylene rubber, ethylene propylene diene rubber, urethane rubber, silicone rubber, fluorine-containing rubber), thermoplastic elastomer and their denatured materials may be used as the viscoelastic members 91 and 92.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
   a movable body;
   a support body;
   a connection body which is provided with at least one of elasticity and viscoelasticity and is disposed so as to contact with both of the movable body and the support body at a position where the movable body and the support body are faced each other; and a magnetic drive circuit which comprises:

a coil provided in the support body; and a permanent magnet provided in the movable body so as to face the coil in a first direction;

wherein the magnetic drive circuit is structured to vibrate the movable body with respect to the support body in a second direction intersecting the first direction;

wherein the support body comprises:

a coil holder which holds the coil; and a power feeding circuit board which is fixed to the coil holder in a state that one side face of the power feeding circuit board faces an outer side, the one side face being provided with a land connected with a coil wire structuring the coil with a solder;

wherein the coil holder comprises a plate part which is extended in a third direction intersecting the first direction and the second direction, and the coil is disposed in the plate part;

wherein the plate part comprises a side plate part formed toward the first direction at an end part on one side in the third direction of the plate part, and the side plate part structures an end face of the coil holder in the third direction;

wherein the side plate part comprises a step part which is retracted from the end face of the coil holder and an opening part in which the power feeding circuit board is fixed to the coil holder in a state that the one side face is retracted from the end face of the coil holder;

wherein the side plate part of the coil holder comprises a guide groove which is opened in the step part for guiding the coil wire from the coil to the power feeding circuit board;

wherein the coil wire comprises a slack portion provided between the coil and a connected position with the power feeding circuit board, and the slack portion is fixed to the one side face with an adhesive; and wherein the slack portion of the coil wire is fixed to the step part and the one side face of the power feeding circuit board with an adhesive at a position retracted from the end face of the coil holder.

2. The actuator according to claim 1, wherein the step part and the one side face are located on a same imaginary plane.

3. The actuator according to claim 2, wherein the solder and the adhesive are located at positions retracted from the end face of the coil holder.

4. The actuator according to claim 1, wherein the solder and the adhesive are located at positions retracted from the end face of the coil holder.

* * * * *